No. 729,185. PATENTED MAY 26, 1903.
L. KAVANAUGH.
MECHANISM FOR TREATING ARABLE LANDS.
APPLICATION FILED NOV. 22, 1902.
NO MODEL.
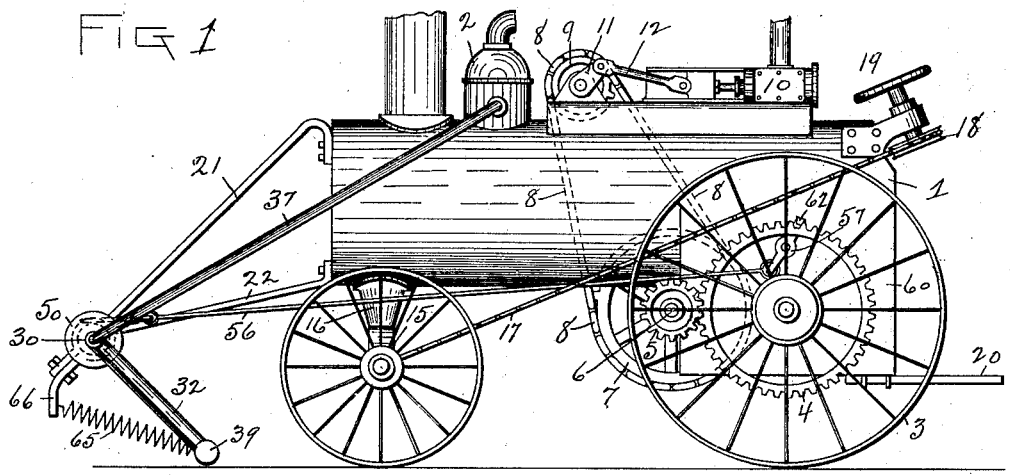
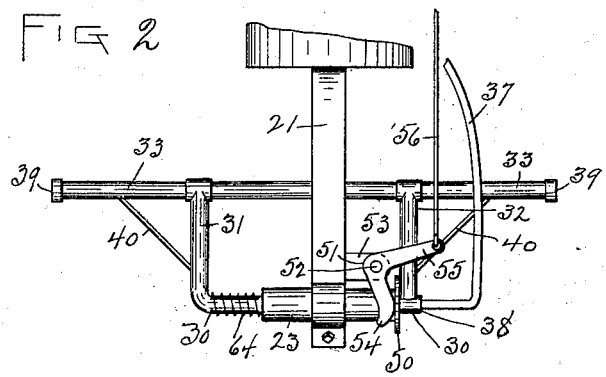
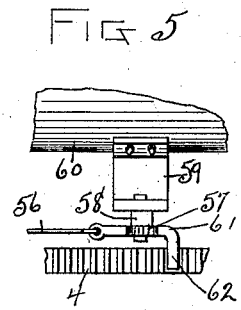
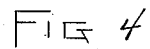
WITNESSES
Wm T Greer
E. M. O'Reilly
INVENTOR
Luke Kavanaugh
By Mosher & Curtis
Attys No. 729,185. Patented May 26, 1903.

UNITED STATES PATENT OFFICE.

LUKE KAVANAUGH, OF WATERFORD, NEW YORK.

MECHANISM FOR TREATING ARABLE LANDS.

SPECIFICATION forming part of Letters Patent No. 729,185, dated May 26, 1903.

Application filed November 22, 1902. Serial No. 132,396. (No model.)

*To all whom it may concern:*

Be it known that I, LUKE KAVANAUGH, a citizen of the United States, residing at Waterford, county of Saratoga, and State of New York, have invented certain new and useful Improvements in Mechanism for Treating Arable Lands, of which the following is a specification.

The invention relates to such improvements; and it consists of the novel construction and combinations of parts hereinafter described and subsequently claimed.

Reference may be had to the accompanying drawings, and the reference characters marked thereon, which form a part of this specification.

Similar characters refer to similar parts in the several figures.

Figure 1 of the drawings is a view in side elevation of an apparatus for treating arable fields with steam. Fig. 2 is a top plan view of a part of the mechanism. Fig. 3 is a plan view of a portion of the delivery pipe or nozzle detached. Fig. 4 is a view similar to that seen in Fig. 3, showing a modified form of construction. Fig. 5 is a top plan view of a part of the operating mechanism adapted to impart endwise reciprocating movements to the nozzle.

The object of this invention is to devitalize or sterilize the germ and larval forms of animal life and the seeds of obnoxious plant life deposited on or beneath the surface of arable lands.

Such invention consists in treating the upper crust of arable land with a fluid heated sufficiently to accomplish such devitalization, as hereinafter more fully described, and pointed out in the claims.

Desirable mechanism for practicing said invention consists of a steam traction-engine, which may be of any known desired form or type, and a spraying-nozzle connected with the steam-chamber of such engine for spraying the surface or injecting steam into the natural pores or other apertures in the soil.

It is well known that the eggs and larva of many noxious animals, especially insects, are deposited in shallow apertures in the soil at a certain season, which at another season develop into animal forms which prey upon cereal growth, also that the seeds of noxious weeds deposited upon the surface of the soil at the end of one season take root in the soil the next season and crowd out more desirable growths. By devitalizing or sterilizing these noxious germs the useful products of the soil will be greatly increased. Most of such germs will instantly become sterile if subjected to excessive heat, as the heat of boiling water.

Referring to the drawings, 1 is a traction-engine having a steam-dome 2 and the usual means for propelling and steering the same, as traction-wheels 3, provided with gear-wheel 4, meshing with pinion 5, fixed upon shaft 6, upon which is fixed a sprocket-wheel 7, driven by sprocket-chain 8, sprocket-wheel 9, driven by the steam piston and cylinder 10 through crank 11, and pitman-rod 12.

The operating-valves and connections being old and well known are not shown.

The front axle 15 has a swivel connection with the bolster-block 16 and is connected by cables 17 with an actuating-pulley 18, having an operating hand-wheel 19. The operator stands upon the step 20.

Projecting forwardly from the front end of the boiler are the braces 21 and 22, which support at their forward ends a tubular bearing 23, Fig. 2. Within this bearing is placed a loose-fitting steam-pipe 30, adapted to have therein oscillatory and longitudinally-reciprocating movements. The pipe 30 has depending rearwardly-inclined branches 31 and 32, which connect with and support the horizontal pipe 33, which extends transversely of the line of direction intended to be traversed by the engine. The horizontal pipe is provided on its lower side with lateral openings 35, which gives it the function of a nozzle adapted to project downwardly jets of steam when connected with a charged steam-chamber, as the dome 2. When desired, some or all of the separate openings 35 may be connected to form a slot 36, as seen in Fig. 3. The nozzle is connected with the dome by the supply-pipe 37, which may have an ordinary well-known packed steam-joint at 38. The ends of the nozzle-pipe are closed, as by the caps 39, and the nozzle-pipe and branches 31 and 32 may be connected by the braces 40. In use the nozzle drags upon the surface of the land to be treated. The nozzle-supporting pipe 30 being free to oscillate or rock in its supporting-tube 23, the nozzle is free to rise and fall and accommodate itself to the varying level of the land-surface. As a means for communicating to the nozzle endwise-reciprocating movements a disk 50 is fixed upon the pipe 30, and a bell-crank lever 51 is fulcrumed at 52 upon the bracket 53, projecting laterally from brace 22. The arm 54 of the bell-crank lever bears upon the disk, and the arm 55 is connected by the cable or rod 56 with one arm of the bell-crank lever 57, fulcrumed upon stud 58 on the bracket 59, which is bolted to the fire-box 60 of the engine. The other arm 61 is provided with a lateral offset 62, forming a dog or pawl adapted to engage with the cogs on the gear-wheel 4. Interposed between one end of the fixed tubular bearing 23 and the branch pipe 31 is a coil-spring 64, which holds the disk 50 against the bell-crank arm 54. Each time, therefore, that a cog on the gear-wheel passes the dog an endwise-reciprocating or to-and-fro movement is communicated to the nozzle, thereby causing the little jets of steam to fully cover the entire surface of land passed over by the nozzle-pipe and making it possible to have fewer nozzle-apertures. A coil-spring 65 may be employed to connect the nozzle or nozzle-supporting branch pipes with a bracket 66 to assist gravity in keeping the nozzle-pipe down to the surface of the soil.

Other fluids may be employed instead of steam, as heated water or a poisonous gas, being forced through a suitable nozzle under pressure.

What I claim as new, and desire to secure by Letters Patent, is—

1. A land-spraying machine comprising a steam-locomotive adapted for self-propulsion over arable lands; a spraying-nozzle consisting of a steam-pipe having lateral openings; means for yieldingly supporting the pipe transversely of the line of direction to be traveled and in close proximity to the ground; and supply connections between such nozzle and the locomotive-boiler.

2. In a land-spraying machine, the combination with a portable steam-boiler; and spraying-nozzle; of steam-pipe connections between the boiler and nozzle, and means for communicating to the nozzle oscillatory movements transversely of the line of direction to be traveled, substantially as described.

In testimony whereof I have hereunto set my hand this 18th day of November, 1902.

L. KAVANAUGH.

Witnesses:
GEO. A. MOSHER,
E. M. O'REILLY.